United States Patent [19]

Williams

[11] 4,429,991

[45] Feb. 7, 1984

[54] METHOD FOR DETECTING PHYSICAL ANOMALIES OF U.S. CURRENCY

[75] Inventor: Charles J. Williams, Carmel, N.Y.

[73] Assignee: The Perkin-Elmer Corporation, Norwalk, Conn.

[21] Appl. No.: 293,067

[22] Filed: Aug. 17, 1981

[51] Int. Cl.³ ...................... G01N 21/17; G01B 11/04

[52] U.S. Cl. ........................................ 356/73; 356/71; 356/239; 356/385

[58] Field of Search ............ 356/71, 73, 239, 383-385, 356/430; 250/556, 560, 562

[56] References Cited

U.S. PATENT DOCUMENTS 3,746,451 7/1973 Croissant et al. .................... 356/430
3,938,663 2/1976 Carnes et al. ........................ 356/71
4,298,807 11/1981 Favre ................................. 250/562

*Primary Examiner*—William H. Punter
*Attorney, Agent, or Firm*—F. L. Masselle; E. T. Grimes; T. P. Murphy

[57] ABSTRACT

Means and methods are provided for examining bills and detecting flaws therein, such as length and width variations, holes, tears and dog-ears or folded corners. Electrical signals are generated by light sensing circuits and compared with signals representing the standard physical characteristics of the bill to indicate deviations therefrom.

5 Claims, 1 Drawing Figure

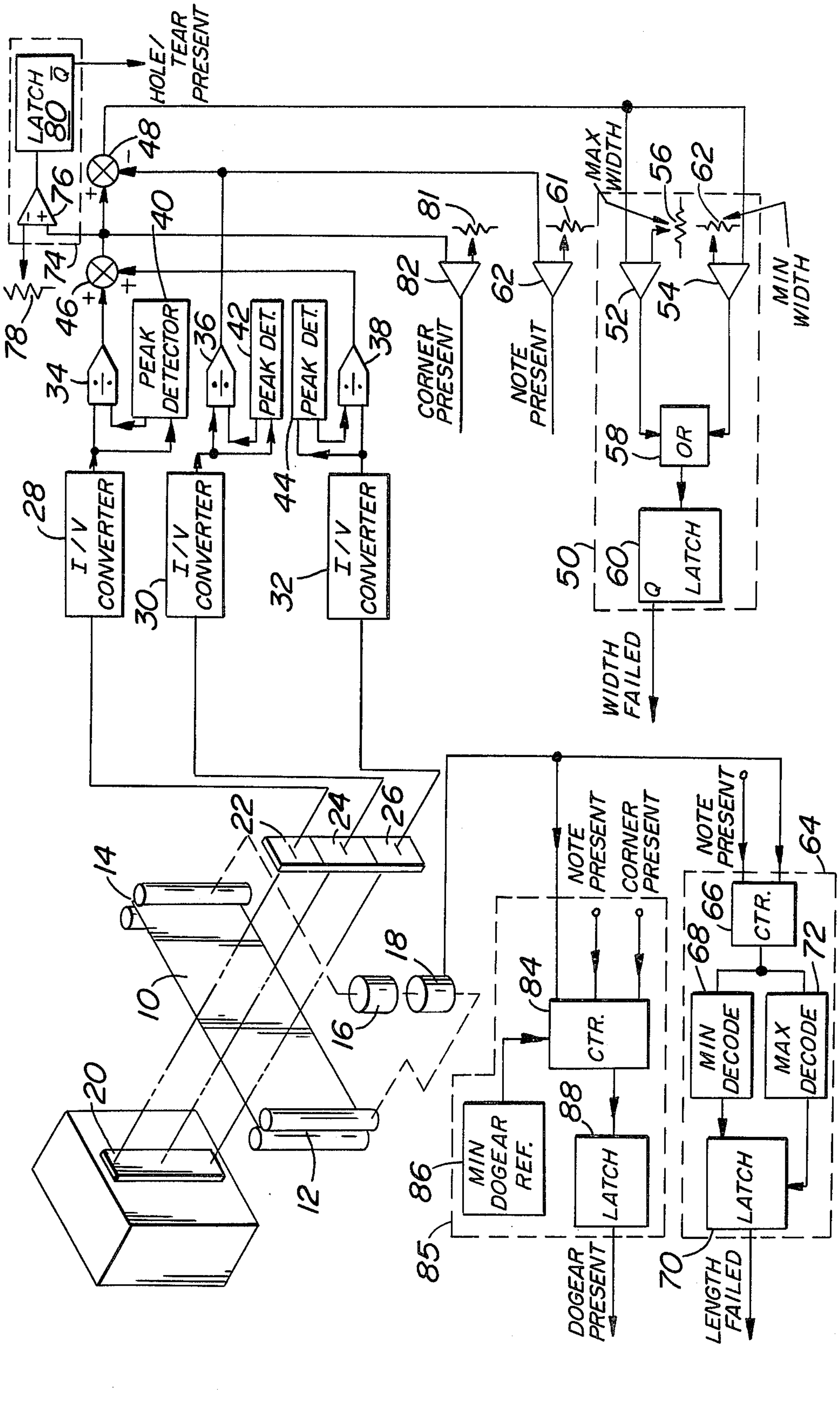
LATCH
80
HOLE/
TEAR
PRESENT
76
48
74
78
46
PEAK
DETECTOR
40
34
36
42
PEAK DET.
PEAK DET.
38
44
I/V
CONVERTER
28
30
32
81
82
CORNER
PRESENT
61
62
NOTE
PRESENT
MAX
WIDTH
56
62
52
54
MIN
WIDTH
OR
58
LATCH
60
50
WIDTH
FAILED
22
24
26
14
10
18
16
20
12
NOTE
PRESENT
CORNER
PRESENT
84
CTR.
88
LATCH
MIN
DOGEAR
REF.
86
85
DOGEAR
PRESENT
NOTE
PRESENT
64
66
CTR.
68
72
MIN
DECODE
MAX
DECODE
LATCH
70
LENGTH
FAILED

METHOD FOR DETECTING PHYSICAL ANOMALIES OF U.S. CURRENCY

BACKGROUND OF THE INVENTION

Circulated bills or notes used in currency, coupons and the like are subjected to many adverse conditions which eventually make them unusable. Excess wear of the bills often leads to tears and holes in the bills. Also, the lengths and widths of the bills may be made shorter by portions of the bills being worn or torn away, or may be made longer by repairs such as taping or stapling two separated pieces. Sometimes the corners of the bills are missing or folded. All of these conditions require that the bills be taken out of circulation.

Various systems have been used for detecting the characteristics of bills. These have been used in money changers and vending machines. Because the general acceptability of bills decreases as they drop below standards of nominal uncirculated bills or notes, it is desirable to provide a single system for inspecting and rejecting bills for the most commonly found defects.

OBJECTS OF THE INVENTION

It is an object of this invention to provide improved methods and means for detecting anomalies in bills used as currency, coupons and the like.

It is a further object of this invention to provide improved methods and means for examining and detecting variations in the widths of bills from a standard width.

It is still a further object of this invention to provide improved methods and means for examining and detecting variations in the lengths of bills from a standard length.

It is still a further object of this invention to provide improved methods and means for detecting holes in bills.

It is still a further object of this invention to provide improved methods and means for detecting tears in bills.

It is still a further object of this invention to provide improved methods and means for detecting so-called "dog-ears" or torn or folded corners in bills.

BRIEF SUMMARY OF THE INVENTION

In accordance with the present invention, means and methods for examining and detecting flaws in bills are provided. The bills are transported one at a time through photo-electric arrangements and detection circuits to produce electrical signals representative of the characteristics of the bills, such as width, length, tears, holes or missing corners. These electrical signals are compared with fixed signals representative of the standard or normal characteristics of the bills. When differences in the two sets of signals are detected, circuits are actuated to indicate the particular flaws detected in the bills.

Other objects and advantages of the present invention will be apparent and suggest themselves to those skilled in the art, from a reading of the following specification and claims, taken in conjunction with the sole FIGURE of the drawing.

BRIEF DESCRIPTION OF THE DRAWING

The sole FIGURE of the drawing is a block diagram, partly in schematic form, illustrating a system for examining and detecting flaws in bills, in accordance with the present invention.

DETAILED DESCRIPTION OF THE PREFERRED EMBODIMENTS

Referring to the drawing, a system is illustrated for inspecting individual bills and detecting flaws therein. The system illustrated is capable of detecting the flaws or anomalies relating to the width of the bills, the length of the bills, the presence of holes or tears in bills, or the presence of dog ears or missing corners in the bills. For purposes of explanation, the operation involving each of these characteristics will be explained separately, it being understood that many of the elements used are common to all the flaw detecting operations of the system.

Width Detection

The width of a circulated bill or note may be narrower than a nominal uncirculated note because a portion has been worn away. In like manner, the width may be wider than a nominal uncirculated note if the note has been torn and then repaired with staples or tape, for example, in such a manner that the two pieces are partly separated.

A circulated note 10 is transported by pairs of rollers 13 and 14. The rollers are driven by a motor 16 in a well known manner. An encoder 18, the purpose of which is to be subsequently described, is connected to the motor 16. Singlers or means for separating bills from a stack and feeding them one at a time to a subsequent utilization device are well known, are not directly related to the invention and therefore not illustrated.

A light source 20 is disposed to project beams of light to photo-detector sensors 22, 24 and 26. The bill 10 is passed between the light source 20 and the photo-detector sensors 22, 24 and 26. Part of the light beams from the light sources 20 pass over the bill 10 to the sensor 22, with some of the light beams passing below the bill 10 to the sensor 26. The light from the center is directed toward the sensor 24. A relatively small amount of light will pass through the bill 10 to the sensor 24. The sensor 24 produces a current proportional to the amount of light transmitted through the bill 10, whereas the sensors 22 and 26 each produce currents proportional to the percentage of their active surface areas left uncovered by the bill 10. The dimensions of the active areas of the sensors may be related to the physical dimensions of the widths and lengths of the bills being processed. For example, the dimensions of the active areas of the sensors may be such that for a bill of nominal width, the top edge of the bill 10 will cover the bottom half of the sensor 22 leaving the upper half uncovered while the bottom edge of the note 10 will cover the top half of the sensor 26 leaving the bottom half uncovered. Sources of light beams and sensors are commercially available from numerous sources and well known to those skilled in the art.

The sensors 22, 24 and 26 produce output current proportional to the light received from the source 20. The current signals from the sensors 22, 24 and 26 are applied to current to voltage (I/V) converters 28, 30 and 32 which convert the current signals into voltage signals. The output voltages from the converters 28, 30 and 32 are then applied to divider circuits 34, 36 and 38, respectively.

The output signals from the converters 28, 30 and 32 are also applied to peak detector circuits 40, 42, and 44 respectively. The purpose of the peak detector circuits 40, 42 and 44 is to produce maximum or peak signals when no bill 10 is being transported to block the light beams between the source 20 and the sensors 22, 24 and 26. In this case, the signals from the converters 28, 30 and 32 will produce maximum signal levels at the peak detectors 40, 42 and 44. These peak signals are used in connection with the signal generated when the bill 10 is being transported between the rollers 12 and 14.

The output signals from the peak detector circuits 40, 42 and 44 are applied to the divider circuits 34, 36 and 38 and serve as the denominator function input signals to the divider circuits. The output signals from the converter circuits 28, 30 and 32 provide the numerator function input signals to the dividers 34, 36 and 38, respectively.

The various circuits illustrated by blocks, such as I/V converters, dividers and peak detectors are known to those skilled in the art and may take a variety of different forms. The present invention is not directed to any of the particular circuitry included in the blocks. For purposes of clarity and for explanation, specific details relating to the circuits are omitted.

The output signals from the divider circuits 34, 36 and 38 are normalized quantities which are proportional to the numerator input signals and are independent of incident light intensity variations. The output signals from the divider circuits 34 and 38 are applied to an adder summing circuit 46 which adds the two applied signals to produce an output voltage proportional to the percentage of the composite areas of the sensors 22 and 26 covered by the bill 10. This output voltage is not dependent on skew or offset of the note 10 which are errors caused by the note being transported slightly above the base line or normal height, or by the note 10 being transported at an angle or with one corner higher than the other. The reason for this is that the area of the bill 10 uncovered on one sensor will be exactly the same size as the area covered on the other sensor.

Because the width of the bill 10 is measured by the amount of light on the uncovered portion of the sensors 22 and 26, an error to this measurement will be introduced by the light transmitted through the note 10 and thereby incident upon the covered portions of the sensors 22 and 26. This error is eliminated by subtracting the output of the divider 36, which is proportional to the amount of light transmitted through the note 10 and applied to the converter 30. The output signal from the divider 36 is applied to one input circuit of a subtracting circuit 48. The output signal from the summing circuit 46 is applied to a second input circuit of the subtracting circuit 48. The output signal from the divider 36 is subtracted from the signal produced by the summing circuit 46 to provide a compensated output signal. The compensated output signal from the subtractor 48 is an output voltage proportional to the width of the note 10, with error terms resulting from skew, offset, light transmitted through the note and incident intensity variations removed.

The output signal from the subtractor 48 is applied to the width detection circuit 50 which includes means for comparing the signals representing the actual width of the bill 10 with signals representing standard or acceptable widths of bills being processed. The compensated output signal from the subtracting circuit 48 is applied to comparator circuits 52 and 54 which detects when a bill is too wide or too narrow.

The comparator 52 is used to detect whether or not the bill 10 exceeded a predetermined maximum width, as for example, if the two pieces of the bill were separated and stapled or taped together. A standard signal is produced from a source indicated by a variable resistor 56 which may be provided to establish a standard width beyond which a bill will be unacceptable. The output signal from the voltage sources or resistor 56 is applied to one input circuit of the comparator 52 with the voltage from the subtractor 48 being supplied to the other input circuit thereof. If the voltage from the subtractor 48 exceeds the voltage from the source 56, an outut signal will be developed by the comparator 52 and applied to an OR gate circuit 58. A signal from the OR gate circuit is applied to a latching circuit 60 which will generate a signal indicating that the bill 10 being inspected is defective because of excessive width.

In a similar manner, the comparator 54 is used to determine whether the minimum width requirements have been met. In this case, again a uniform or standard voltage from a source 62 is applied to one input circuit of the comparator 54 and the voltage from the subtracting circuit 48 being applied to the other input circuit thereof. When the output signal between the subtractor and source 62 exceeds a predetermined amount, a signal is applied through the OR gate 58 to the latching circuit 60. An output signal will be generated by the latching circuit 60 indicating that the width has failed.

The latching circuit 60 will generate an output signal when the width of the bill being tested is too wide or too narrow. The latching circuit 60 may be a well known bistable circuit designed to generate a logic "1" output when it receives a signal from the OR gate 58 and a logic "0" when no signal is received therefrom. The latching circuit 60 may include a bistable circuit connected to various indicators in the system. The indicators, for example, could include a light or sound producing device indicating to an operator that the bill being tested has failed the width test.

During the testing of a bill 10, an output signal from the divider 36 is also applied to a monitor comparator circuit 62, which compares the applied signal to a source 61. After the comparison, an output signal is produced at the comparator 62 indicating the presence of a bill under test. The signal representing "Note Present" is used in a number of the operations being used and to be described.

The latching circuit 60 generates an output signal at the end of a note interval which will be indicated by a signal transition of a voltage monitor circuit 62 indicating that a note is present.

Length of Note

The next characteristic to be considered relates to the length of the bill 10 being inspected. This is accomplished by a length detection circuit 64.

A counter 66 receives pulse or count signals from the encoder 18. Such decoders from generating pulse signals to indicate distance or motor rotations are well known. The counter 66, however, will be activated only when a bill is present as indicated by an output signal from the monitor comparator circuit 62.

When a bill is present, the counter 66 counts the pulses from the encoder 18. The counter output signals, which is a digital word indicative of the number of pulses counted, is decoded at the end of a note interval. Minimum decode circuit 68 produces an output signal when the count involved is below the minimum number of pulses required for length acceptance. In this event, an output signal is produced by the decode circuit 68 and applied to a latching circuit 70. The latching circuit 70 may be connected to a suitable utilization device indicating that the bill being inspected has or has not passed the length test.

In like manner, the output from the counter 66 is applied to a maximum decode circuit 72, which produces an output signal when the count exceeds a predetermined length indicating that the length of the bill is too long. At this point, a signal is generated and applied to the latching circuit 70, which in turn produces a signal indicative that the length of the bill being inspected has failed. The length detection circuit 64 requires that the length of the bill 10 being inspected fall within predetermined minimum and maximum lengths. Otherwise, a reject or defect in the bill will be indicated.

The latching circuit 70 may be a bi-stable circuit capable of generating logic "1" and "0" output signals dependent upon the signal conditions of the decode circuits 68 and 72.

Holes and Tears in Bill

Holes and tears in the bill being inspected are detected by a circuit 74. As previously mentioned, the output signals from the summing circuit 46 is a voltage proportional to a percentage of the composite areas of the sensors 22 and 26 which are covered by the note 10, which is nominally 50%. However, if a hole or tear is present in a portion of the note, a much larger percentage of the area will be momentarily exposed to the light thereby causing the output of the summing circuit 46 to increase to a large amplitude during the time that the hole or tear is present in front of the sensor.

The output signal of the summing circuit 46 is continuously being monitored and applied to one input circuit of a comparator circuit 76. A source of fixed voltage, represented by a variable resistor 78, represents a standard voltage for comparison purposes. The standard voltage from source 78, representing, for example, a minimum size acceptable hole, is applied to the other input terminal of the comparator 76.

If the voltage from the summing circuit 46 exceeds the reference threshold level voltage from the source 78, the presence of a hole or tear in the bill is indicated. If at any time while the bill 10 is being transported, the comparator 76 produces an output signal, it is applied to a latching circuit 80. The latching circuit 80 will hold this output signal even though the output signal from the comparator 76 may return to its original state when the hole or tear is passed and the remainder of the note is being inspected. The output stage of the latching circuit may be inspected at the end of a note interval to determine if its output signal is indicative that a hole or tear is in the note or wheather the note is free of such holes or tears. The latching circuit 80 may be connected to suitable indicating means.

The hole and tear detection circuit 74 detects holes in the outer portions of the note inspected by the detectors or sensors 22 and 26. Holes in the center of the bill 10 will cause the output signals from the convertor 30 to momentarily produce a large voltage as light from the light source 20 shines through the holes directly on the sensor 24. The signal from the divider 36 causes an output signal at the monitor comparator 62 indicating that there is bill presence. A signal indicating that no bill is present, will cause the counter 66 in the length detection circuit 64 to stop counting and interpret the absence of the bill as being the start of a new bill. The counter 66, however, will measure the length of the remaining portion of the bill after the hole is passed. Since the nominal length of a typical bill may be $150\pm3$ mm, a hole which is at least 6 mm in diameter located in the center of a bill 10 will cause the note to fail the length test. It is recognized that the overall purpose of the system illustrated relates to detection of a flaw in the bill regardless of what the flaw is.

Dog Ears or Folded-Over Corners

As previously mentioned, the voltage monitor or comparator 62 produces an output signal indicative of the presence of a bill by monitoring the output signal of the divider 36 associated with the middle sensor 24. In like manner, a signal monitor or comparator circuit 82 produces an output signal indicative of the presence of a note by monitoring the output of the summing circuit 46. The summing circuit 46 in turn is associated with the output signal from the sensors 22 and 26. The output signal from the adder or summing circuit 46 is applied to one input circuit of the comparator 82. A second standard signal is applied to a second input circuit from a source 81, which establishes a signal representing the minimum acceptable standard. The presence of a dog ear or absence of a corner in the bill being processed will be indicated by an output signal from the comparator 82 which produces a signal later than the comparator 62.

The output signal from the encoder 18 is applied to a down counter 84 included in a dog-ear detector circuit 85. The counter 84 is normally in a reset position by a signal from a source 86, which also provides a minimum signal indicative of a standard or acceptable level. When the down counter 84 is enabled, it starts to count pulse signals from the decoder 18. The down counter measures the distance that the bill 10 has moved during the time that the bill is present, as indicated by a signal from the comparator 62, and a signal representing that no corner has been detected, as indicated by a signal from the comparator 82. This distance is the measure of a dog-ear or absence of a corner. If the length exceeds the minimum size allowable, as indicated by a signal from the source 86, the counter 84 produces a signal which is applied to a latch circuit 88. The latch circuit generates an appropriate "1" or "0" logic signal to indicate the presence or absence of a dog-ear or missing corner in the bill being processed.

It is seen that the present invention has provided a system for detecting a number of different types of flaws in a bill. At the same time, the system utilizes substantially the same main components to perform the functions for detecting the flaws. The main components of the system involving the light source, transporting means, signal processing systems, are substantially the same for detecting all the different flaws. The only additional requirements for particular flaws involve relatively simple logic and comparator circuits.

What is claimed is:

1. A system for examining and detecting anomalies in bills comprising:
   a source of light;
   light detector means comprising at least first, second and third light detectors aligned to detect light from said source of light above, through and below said bill, respectively, and to generate electrical signals corresponding with the amount of light received from said source;

means for transporting one of said bills between said light source and said light detector means to control the amount of light reaching said detector;

first, second and third peak level detector circuits to respond to electrical signals from said first, second and third detectors to produce and maintain peak output signals representative of the peak output signal levels from said first, second and third detectors when no bill is present between said source of light and said detectors, first, second and third divider circuits for receiving the electrical signals from said first, second and third detectors and the peak output signals from said first, second and third peak detector circuits to produce divided output signals therefrom, an adder circuit for receiving the divided output signals from said first and third divider circuits to provide an added output signal representing the sum of the signals received from said first and third detectors, a subtractor circuit for receiving the divided output signal from said second divider circuit and the added output signal from said adder circuit to produce a subtracted output signal representing the actual width of the bill.

2. A system as set forth in claim 1 wherein there are provided a note detector circuit responsive to electrical signals from said light detector means for generating a signal when a bill is being processed, a pulse generator for generating pulse signals while said bill is being processed, a counter circuit, means for applying said pulse signals and said signal from said note detector circuit to said counter circuit to generate output pulse signals therefrom only when said bill is being processed, sources of minimum and maximum length standard decode signals for receiving and comparing the pulse signals from said counter to standard acceptable maximum and minimum length signals to generate output signals therefrom when the deviations of said bill being processed deviate from either of said minimum or maximum standard decode signals, and a latch circuit to receive said output signals from said minimum and maximum length decode circuits to indicate deviations in the length of the bill being processed beyond acceptable standards.

3. A system as set forth in claim 1 wherein there is provided a width detector circuit comprising means for generating maximum and minimum signals representing the maximum and minimum acceptable widths of said bill being processed, comparators for receiving said maximum and minimum width signals, means for applying said subtracted signal from said subtractor to said comparators to produce output signals therefrom when said subtracted signal deviates from said minimum or maximum width signal, a latching circuit reponsive to output signals from said comparators to indicate the width characteristic of the bill being processed.

4. A system as set forth in claim 1 wherein a hole and tear detector circuit for detecting holes and tears in the outer portion of a bill being processed comprises a threshold level voltage source representing an acceptable minimum level as related to said hole or tear, a hole and tear comparator circuit, means for applying signals from said adder circuit and said threshold level voltage sources to said hole and tear comparator circuit to generate an output signal when the differences between the signals from said adder and said threshold level sources exceed a predetermined level, a hole and tear latching circuit, and means for applying said output signal from said hole and tear comparator circuit to said latching circuit to indicate a hole or tear in the bill being processed.

5. A system as set forth in claim 1 wherein there is provided a corner detection circuit to indicate the absence of a corner in a bill being processed comprising a corner present signal circuit, a reference signal source representing a level of acceptance, means for applying the added output from said adder circuit and the signal from said reference level source to generate a signal when the differences between the two applied signals indicate the presence of the corners in the bill being processed, a note present circuit responsive to produce an output signal while a bill is being processed, a pulse generator for generating pulses while said bill is being processed, a count down circuit, means for setting said count down circuit to a predetermined count representative of an acceptable bill, said count down circuit receiving signals from said corner present circuit, note present circuit and said pulse generator to generate an output signal when the signals from said present circuit, note present circuit and said pulse generator are not applied long enough to count down said count down circuit to zero, a latching circuit, means for applying said output signal from said count down circuit to said latch circuit to produce a signal indicating the absence of a corner in the bill being processed.

* * * * *